United States Patent
Sungail et al.

[11] Patent Number: 5,736,587
[45] Date of Patent: Apr. 7, 1998

[54] PROCESS FOR THE PRODUCTION OF MOLDED POLYURETHANE PRODUCTS

[75] Inventors: Craig M. Sungail, Venetia; Kenneth R. Riddle, Leetsdale, both of Pa.

[73] Assignee: Bayer Corporation, Pittsburgh, Pa.

[21] Appl. No.: 454,489

[22] Filed: May 30, 1995

Related U.S. Application Data

[63] Continuation-in-part of Ser. No. 312,375, Sep. 26, 1994, abandoned.

[51] Int. Cl.$^6$ .................................................. C08G 18/30
[52] U.S. Cl. ...................... 521/125; 521/128; 521/163; 521/176; 528/45
[58] Field of Search .............................. 521/125, 128, 521/163, 176; 528/45

[56] References Cited

U.S. PATENT DOCUMENTS

| | | | |
|---|---|---|---|
| 3,896,052 | 7/1975 | Lockwood et al. | 252/431 |
| 3,903,018 | 9/1975 | Kolakowski et al. | 252/431 |
| 3,986,991 | 10/1976 | Kolakowski et al. | 260/2.5 AW |
| 4,011,180 | 3/1977 | Lockwood et al. | 260/2.5 AW |
| 4,101,465 | 7/1978 | Lockwood et al. | 521/118 |
| 4,255,526 | 3/1981 | Yukuta et al. | 521/108 |
| 4,644,017 | 2/1987 | Haas et al. | 521/129 |
| 4,740,528 | 4/1988 | Garvey et al. | 521/128 |
| 4,750,963 | 6/1988 | Kunishige et al. | 525/458 |
| 4,868,043 | 9/1989 | Eling et al. | 428/304.4 |
| 5,157,057 | 10/1992 | Pence et al. | 521/118 |
| 5,162,382 | 11/1992 | Carswell et al. | 521/51 |
| 5,496,869 | 3/1996 | Williams et al. | 521/172 |

FOREIGN PATENT DOCUMENTS

| | | |
|---|---|---|
| 294 161 | 12/1988 | European Pat. Off. . |
| 4202414 | 7/1992 | Japan . |

OTHER PUBLICATIONS

"Problems of interaction between plasticized PVC and polyurethane foam", Plastic & Rubber International, vol. 13, No. 1, Feb. 1988, pp. 23–25.

"The Influence of Polyurethane Foam on the Heat Staining of Instrument Panels", SAE Technical Paper, Feb. 29–Mar. 4, 1988, #880507.

"The Discoloration of Vinyl Instrument Panels by Polyurethane Foam Backing. II: Crosslinking of the Vinyl Resin," Journal of Vinyl Tech. Mar. 1992, vol. 14, pp. 2–5.

Amine–Free Catalyst Systems for Automotive Instrument Panes, Journal of Cellular Plastics vol. 28, Mar. 1992, pp. 160–174.

*Primary Examiner*—Rachel Gorr
*Attorney, Agent, or Firm*—Joseph C. Gil; Noland J. Cheung

[57] ABSTRACT

The present invention is directed to a process for the preparation of a molded product. The method requires the introduction of a polyurethane foam forming reaction mixture into a mold. The present invention is directed to the use of a metal carboxylate salt of an amino acid as a catalyst for the reaction.

7 Claims, No Drawings

PROCESS FOR THE PRODUCTION OF MOLDED POLYURETHANE PRODUCTS

CROSS REFERENCE TO RELATED APPLICATION

This application is a Continuation-In-Part of U.S. application Ser. No. 08/312,375, filed on Sep. 26, 1994, now abandoned.

BACKGROUND OF THE INVENTION

Amine catalysis in the production of semi-rigid polyurethanes (e.g., in producing automotive instrument panels) is well known in the art despite several disadvantages. These disadvantages include a) staining of the polyvinyl chloride ("PVC") skin adhered to the polyurethane upon exposure to heat and/or light, and b) a loss of elongation of PVC or acrylonitrile/butadiene/styrene ("ABS") skins adhered to the polyurethane upon exposure to heat and/or light, (see, e.g., "Problems of interaction between plasticized PVC and polyurethane foam", *Plastics & Rubber International*, volume 13, number 1, February 1988, pages 23–25; "The Influence of Polyurethane Foam on the Heat Staining of Instrument Panels", *SAE Technical Paper*, February 29–Mar. 4, 1988, #880507; "The Discoloration of Vinyl Instrument Panels by Polyurethane Foam Backing. II: Crosslinking of the Vinyl Resin," Journal of Vinyl Technology, March 1992, Vol. 14, No. 1, pages 2 through 5; and U.S. Pat. No. 4,644,017). Both of the difficulties noted have been linked, at least in part, to the presence of amines with high migratory tendencies in polyurethane foam.

Carboxylate salts (especially low molecular weight acids with alkali metals) have also been used as catalysts for semi-rigid polyurethane foams. While the heat aging of these salt catalyzed systems is better than amine-catalyzed systems, they also suffer from some disadvantages. These disadvantages include a) long demold times which necessarily increase manufacturing costs, b) poor cell structure in the foam which can lead to bleed through and/or poor feel, and c) the need for additional co-catalysts, which also increase costs (see, e.g., U.S. Pat. Nos. 4,868,043 and 5,162,382; published European Patent Application 294,161; and "Amine-Free Catalyst Systems for Automotive Instrument Panels", *Journal of Cellular Plastics*, Volume 28, March 1992, pages 160–174).

Various catalyst combinations are known for the trimerization of polyisocyanates to polyisocyanurates and for the use thereof in preparing polyisocyanurate foams. Various such combinations containing an alkali metal salt of an N-(2-hydroxyphenyl)-methyl glycine are described in U.S. Pat. Nos. 3,896,052, 3,903,018, 3,986,991, 4,011,180 and 4,101,465.

In addition, U.S. Pat. No. 5,157,057 describes a non-cellular, reaction injection molded polyurethane system having reduced reactivity using an acid blocked amino acid salt catalyst.

Finally, U.S. Pat. No. 4,740,528 describes a superwicking crosslinked polyurethane from components including an amino acid salt. The acid salt is used in the form of an aqueous solution which is then apparently reacted with an isocyanate-terminated prepolymer. The amino acid cannot catalyze any hydroxyl/isocyanate reaction since all the hydroxyl materials are prereacted to form the prepolymer.

The object of the present invention was to develop a catalyst for use in the production of polyurethane foams, and preferably semi-rigid polyurethane foams, which did not suffer from the various problems noted above.

DESCRIPTION OF THE INVENTION

The present invention is therefore directed to an improved process for the preparation of a molded product comprising:
a) introducing a polyurethane forming reaction mixture into a mold, said reaction mixture comprising:
  1) one or more relatively high molecular weight polyether polyols,
  2) water, in an amount of from 0.75 to 3.5% by weight based upon the weight of all the isocyanate-reactive components,
  3) one or more catalysts, and
  4) one or more polyisocyanates, with the amounts of reactants being such that the isocyanate to active hydrogen equivalent ratio is from 0.40:1 to 1.30:1,
c) allowing said reaction mixture to fully react, and
d) removing the resultant product from the mold, the improvement wherein said catalyst comprises a catalytic amount of a metal carboxylate salt of an amino acid.

In the most preferred embodiment, a plastic film or sheet is placed in the mold before introduction of the reaction mixture and the reaction mixture is introduced on top of the film or sheet.

The present invention has several advantages over prior art systems:

i) the use of co-catalysts can be significantly reduced, or even eliminated;

ii) the heat aging problems are minimized by reducing the migratory tendencies of the catalysts over the conventional amine catalysts previously used in the art;

iii) good cell structure and overall physical properties of the resultant foam are achieved;

iv) the catalysts used in the present invention are active at or near the same concentrations used for conventional amine catalysts; and v) the demold times are as low as those attainable for systems using conventional amine catalysts.

The amino acid can be substantially any amino acid, including α-, β-, γ-, and δ-amino acids and all their various stereo isomers. It is presently preferred to use α-amino acids, and most preferred are those α-amino acids of the formula:

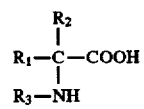

where
$R_1$ is selected from the group consisting of H, a $C_1$ to $C_{18}$ alkyl group (which may be straight or branched chain and which may be substituted with groups selected from the group consisting of amide, amine, guanidino, hydroxyl, carboxylic, thioether, thiol or disulfide), a $C_3$ to $C_6$ cycloaliphatic group, a $C_6$ to $C_{10}$ aromatic group, a $C_7$ to $C_{28}$ aralkyl group, an imidazole group or together with $R_3$ forms a heterocyclic ring;

$R_2$ is H or together with $R_3$ forms a heterocyclic ring or together with $R_1$ forms an aromatic or aliphatic ring;

$R_3$ is selected from the group consisting of H, $C_1$ to $C_{18}$ alkyl, and $C_7$ to $C_{28}$ alkaryl or together with either $R_1$ or $R_2$ forms a heterocyclic ring.

Specific amino acids within the above formula include glycine, alanine, valine, leucine, isoleucine, serine, threonine, cysteine, cystine, methionine, lysine, arginine, phenylalanine, tyrosine, proline, hydroxyproline, histidine, tryptophan, aspartic acid, asparagine, glutamine, thryoxine, o-aminobenzoic, m-aminobenzoic, p-aminobenzoic and glutamic acids.

To form the salt, the amino acid is merely mixed with a metal compound basic enough to form a carboxylate salt with the amino acid. The metals include substantially any Group I, Group II or transition metal hydroxide, carbonates or metal alcoholic oxide. The counter ions that generally have hydroxides and carbonates basic enough to form amino acid carboxylate are lithium, sodium, potassium, calcium, strontium and barium. Aluminum, zinc and cadmium also have fairly basic forms but are only slightly soluble in water. Hydroxides and, carbonates of nickel, magnesium, manganese, coppers (I) and (II), and iron (III) would also be expected to work, but very slowly as their solubilities in water are very limited. Preferred metal compounds are the alkali metal and alkaline earth metal hydroxides, with potassium hydroxide being most preferred. Specific metal compounds are lithium hydroxide, sodium hydroxide, calcium hydroxide, potassium hydroxide, lithium hydroxide, strontium hydroxide, barium hydroxide, aluminum hydroxide, zinc hydroxide, cadmium hydroxide, potassium carbonate, sodium carbonate, calcium carbonate, lithium carbonate, strontium carbonate, barium carbonate, aluminum carbonate, zinc carbonate and cadmium carbonate. The metal alcoholic oxides include both aliphatic and aromatic alcohols. Examples include potassium methoxide, sodium methoxide, lithium methoxide, potassium ethoxide, sodium ethoxide, lithium ethoxide, potassium isopropoxide, sodium isopropoxide, and lithium propoxide, and potassium ethoxide.

In preparing the salt, it is critical to have an excess of acid groups. This can be accomplished by neutralizing from 51 to less than 100% of the carboxylic acid moieties of the amino acid and preferably by neutralizing from 95 to 99% of the carboxylic acid moieties. Excess base will lead to over catalysis of the polyol/isocyanate/foaming reaction. In other words, from more than 0 up to 49% (and preferably from 1 to 5%) molar equivalent excess, based on the carboxylic acid groups of the amino acid, is used relative to the base.

It is generally preferred that all water of the reaction must be removed, generally by using vacuum (10 mm Hg or less) and heat (generally less than 100° C.), optionally over a desiccant. Of course, the removal of water in most industrial applications is time consuming and does add to the cost of the final product. In some instances, it may be more cost effective to leave the amino acid salt in an aqueous solution. Thus, the amine salt can be used anywhere from a totally dry salt to a 15% aqueous solution. Excess water may lead to more carbon dioxide evolution during the isocyanate-/water reaction than is desired, and for this reason, it is preferred to use a dry salt.

When mixing the amino acid metal salts into the reaction mixture, it is often more convenient to dissolve the salt in the total amount of water to be used as blowing agent and then to add the salt-containing water to the polyol reactants.

The amount of alkali metal salt used must be at least a catalytic amount, and typically ranges from as low as 0.1% by weight (in the case of the use of co-catalysts) to as high as 7.5% by weight (and preferably from 1.0 to 5.5% by weight) based upon the total weight of all isocyanate-reactive components in the reaction mixture.

The reaction mixture of the present invention includes relatively high molecular weight polyols and polyisocyanates. These materials are all known in the polyurethane art.

Suitable relatively high molecular weight polyether polyols include those conventionally used in polyurethane chemistry. Suitable polyols have average molecular weights in the range of from about 400 to about 10,000 (preferably about 2000 to about 6000) and contain 2 to 8 hydroxyl groups (preferably, 2 to 3 hydroxyl groups).

Suitable polyethers are known and may be prepared, for example, by the polymerization of epoxides, optionally in the presence of a catalyst such as $BF_3$, or by chemical addition of such epoxides, optionally as mixtures or successively, to starting components containing reactive hydrogen atoms. Suitable epoxides include ethylene oxide, propylene oxide, butylene oxide, tetrahydrofuran, styrene oxide, or epichlorohydrin. Suitable starter components include water, alcohols, or amines, including, for example, ethylene glycol, 1,2- or 1,3-propanediol, 1,2-, 1,3-, or 1,4-butanediol, trimethylolpropane, 4,4'-dihydroxydiphenylpropane, aniline, ammonia, ethanolamine, or ethylene diamine. Sucrose polyethers of the type described, for example, in German Auslegeschrifts 1,176,358 and 1,064,938 may also be used according to the invention. Polyethers that contain predominantly primary hydroxyl groups (up to about 90% by weight, based on all of the hydroxyl groups in the polyether) are also often preferred. Polyethers modified by vinyl polymers of the kind obtained, for example, by the polymerization of styrene and acrylonitrile in the presence of polyethers (e.g., U.S. Pat. Nos. 3,383,351, 3,304,273, 3,523,093, and 3,110,695 and German Patent 1,152,536) are also suitable, as are polybutadienes containing hydroxyl groups. Particularly preferred polyethers include polyoxyalkylene polyether polyols, such as polyoxyethylene diol, polyoxypropylene diol, polyoxybutylene diol, and polytetramethylene diol.

Polyethers in which polyadducts or polycondensates or polymers are present in a finely dispersed or dissolved form may also be used according to the invention. Polyethers of this type may be obtained, for example, by carrying out polyaddition reactions (e.g., reactions between polyisocyanates and amino functional compounds) or polycondensation reactions (e.g., between formaldehyde and phenols or amines) in situ in the above-mentioned hydroxyl-containing compounds. Processes of this type are described, for example, in German Auslegeschritis 1,168,075 and 1,260,142 and German Offenlegungsschrifts 2,324,134, 2,423,984, 2,512,385, 2,513,815, 2,550,796, 2,550,797, 2,550,833, 2,550,862, 2,633,293, and 2,639,254.

General discussions of representative polyethers that may be used according to the present invention can be found, for example, in *Polyurethanes, Chemistry and Technology*, edited by Saunders and Frisch, Interscience Publishers, New York, London, Volume I, 1962, pages 32–42 and pages 44–54, and Volume II, 1964, pages 5–6 and 198–199, and in *Kunststoff-Handbuch*, Volume VII, edited by Vieweg and H öchtlen, Carl-Hanser-Verlag, Munich, 1966, on pages 45–71.

In some instances, it may be desirable to include low molecular weight active hydrogen containing compounds in the reaction mixture. Suitable low molecular weight isocyanate reactive compounds are also known in the art. Such compounds have two or more isocyanate-reactive hydrogen atoms and have molecular weights of from 32 to 399. Such compounds contain hydroxyl groups, amino groups, thiol groups, and/or carboxyl groups and generally contain 2 to 8 (preferably 2 to 4) isocyanate-reactive hydrogen atoms. Examples of useful amines include 1,4-diaminobenzene, 2,4-diaminotoluene, 2,4'-and/or 4,4'-diaminodiphenylmethane, 3,3'-dimethyl-4,4'-diaminodiphenylmethane, 1-methyl-3,5-bis(methylthio)-2,4- and/or -2,6-diaminobenzene, 1,3,5-triethyl-2,4- diaminobenzene, 1,3,5-triisopropyl-2,4-diaminobenzene, 1-methyl-3,5-diethyl-2,4- and/or -2,6-diaminobenzene, 4,6-dimethyl-2-ethyl-1,3-diaminobenzene, 3,5,3',5'-tetraethyl-4,4-diaminodiphenylmethane, 3,5,3',5'-tetraisopropyl-4,4'-diaminodiphenylmethane, and 3,5-diethyl-3',5'-diisopropyl-4,4'-diaminodiphenylmethane. Such diamines may, of course, also be used as mixtures. Examples of useful hydroxyl containing compounds include glycols and polyols, such as 1,2-ethanediol, 1,2- and 1,3-propylene glycol, 1,4- and 2,3-butylene glycol, 1,6-hexanediol, 1,8-octanediol, neopentyl glycol, cyclohexanedimethanol, 1-methyl-1,3-propanediol, 2-methyl-1,3-propanediol, glycerol, trimethylolpropane, 1,2,6-hexanetriol, 1,2,4-butanetriol, and trimethylolethane.

Suitable organic polyisocyanates include aliphatic, cycloaliphatic, araliphatic, aromatic, and heterocyclic polyisocyanates of the type described, for example, by W. Siefken in *Justus Liebigs Annalen der Chemie*, 562, pages 75 to 136. Such isocyanates include those having the formula

in which n is a number from 2 to about 5 (preferably 2 to 3) and Q is an aliphatic hydrocarbon group containing 2 to about 18 (preferably 6 to 10) carbon atoms, a cycloaliphatic hydrocarbon group containing 4 to about 15 (preferably 5 to 10) carbon atoms, an araliphatic hydrocarbon group containing 8 to 15 (preferably 8 to 13) carbon atoms, or an aromatic hydrocarbon group containing 6 to about 15 (preferably 6 to 13) carbon atoms. Examples of suitable isocyanates include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate, and mixtures of these isomers; 1-isocyanato-3,3,5-trimethyl-5-isocyanato-methylcyclohexane ("isophorone diisocyanate"; see, e.g. German Auslegeschrift 1,202,785 and U.S. Pat. No. 3,401,190); 2,4- and 2,6-hexahydrotoluene diisocyanate and mixtures of these isomers; dicyclohexylmethane-4,4'-diisocyanate ("hydrogenated MDI", or "HMDI"); 1,3- and 1,4-phenylene diisocyanate; 2,4- and 2,6-toluene diisocyanate and mixtures of these isomers ("TDI"); diphenylmethane-2,4'- and/or -4,4'-diisocyanate ("MDI"); naphthylene-1,5-diisocyanate; triphenylmethane-4,4',4"-triisocyanate; polyphenyl-polymethylene-polyisocyanates of the type which may be obtained by condensing aniline with formaldehyde, followed by phosgenation ("crude MDI"), which are described, for example, in British Patents 878,430 and 848,671; norbornane diisocyanates, such as described in U.S. Pat. No. 3,492,330; m- and p-isocyanatophenyl sulfonylisocyanates of the type described in U.S. Pat. No. 3,454,606; perchlorinated aryl polyisocyanates of the type described, for example, in U.S. Pat. No. 3,227,138; modified polyisocyanates containing carbodiimide groups of the type described in U.S. Pat. No. 3,152,162; modified polyisocyanates containing urethane groups of the type described, for example, in U.S. Pat. Nos. 3,394,164 and 3,644,457; modified polyisocyanates containing allophanate groups of the type described, for example, in British Patent 994,890, Belgian Patent 761,616, and published Dutch Patent Application 7,102,524; modified polyisocyanates containing isocyanurate groups of the type described, for example, in U.S. Pat. No. 3,002,973, German Patents 1,022,789, 1,222,067 and 1,027,394, and German Offenlegungsschrifts 1,919,034 and 2,004,048; modified polyisocyanates containing urea groups of the type described in German Patent 1,230,778; polyisocyanates containing biuret groups of the type described, for example, in German Patent 1,101,394, U.S. Pat. Nos. 3,124,605 and 3,201,372, and in British Patent 889,050; polyisocyanates obtained by telomerization reactions of the type described, for example, in U.S. Pat. No. 3,654,106; polyisocyanates containing ester groups of the type described, for example, in British Patents 965,474 and 1,072,956, in U.S. Pat. No. 3,567,763, and in German Patent 1,231,688; reaction products of the above-mentioned isocyanates with acetals as described in German Patent 1,072,385; and polyisocyanates containing polymeric fatty acid groups of the type described in U.S. Pat. No. 3,455,883. It is also possible to use the isocyanate-containing distillation residues accumulating in the production of isocyanates on a commercial scale, optionally in solution in one or more of the polyisocyanates mentioned above. It is also possible to use mixtures of the polyisocyanates described above.

In general, it is preferred to use readily available polyisocyanates, such as 2,4- and 2,6-toluene diisocyanates and mixtures of these isomers ("TDI"); polyphenyl-polymethylene-polyisocyanates of the type obtained by condensing aniline with formaldehyde, followed by phosgenation ("crude MDI"); and polyisocyanates containing carbodiimide groups, urethane groups, allophanate groups, isocyanurate groups, urea groups, or biuret groups ("modified polyisocyanates").

The amounts of isocyanate and active hydrogen containing materials are such that the isocyanate group to active hydrogen equivalent ratio is from 0.40:1 to 1.30:1.

Water must also be present in an amount of from 0.75 to 3.5 (and preferably from 1.0 to 2.0)% by weight based upon the total weight of all the isocyanate-reactive components in the reaction mixture.

Auxiliary agents and additives may optionally also be used in the process of the invention. Suitable auxiliary agents and additives include, for example, surface-active additives, cell regulators, pigments, dyes, UV stabilizers, plasticizers, fungistatic or bacteriostatic substances, and fillers, such as those described in European Patent Application 81,701 at column 6, line 40, to column 9, line 31.

Silicone surfactants may also be used (generally in amounts of from about 0.05 to about 1.0% by weight, based upon the total weight of all the isocyanate-reactive components in the reaction mixture. These are known in the art. Polyether siloxanes are particularly suitable silicone surfactants; especially useful are those which are water soluble. These compounds generally have a polydimethyl siloxane group attached to a copolymer of ethylene oxide and propylene oxide. Foam stabilizers of this kind are known and have been described, for example, in U.S. Pat. Nos. 2,834,748, 2,917,480 and 3,629,308. Also useful are the known polysiloxane surfactants generally used in the polyurethane art.

The reaction mixture can also contain a co-catalyst for catalyzing the reaction between isocyanate groups and hydroxyl groups (i.e., a urethane catalyst). The urethane catalysts are generally known and include tertiary amines such as triethylamine, tributylamine, N-methyl-morpholine, N-ethylmorpholine, N-cocomorpholine, N,N,N',N"-tetramethyl-ethylene-diamine, 1,4-diaza-bicyclo-(2,2,2)-octane, N-methyl-N'-dimethyl-amino-ethylpiperazine, N,N-dimethylbenzylamine, bis-(N,N-diethyl-aminoethyl)-adipate, N,N-diethylbenzylamine, pentamethyl-diethylene-triamine, N,N-dimethyl-cyclohexylamine, N,N,N',N"-tetramethyl-1,3-butanediamine, N,N-dimethyl-β-phenylethylamine 1,2-dimethylimidazole, 2-methylimidazole, m-aminoaniline, N,N- dimethylaminoethanol, 2(2-dimethylaminoethoxy)ethanol, N,N,N',N',N"-pentamethyldipropylene-diamine, N,N-dimethlyamino-N"-methylaminoethanol, 2,2-N-dimethyl-6-N-methyl-2,6-diazononanal and the like. Also useful are the commercially available tertiary amines such as Niax A1 and Niax A107, available from Union Carbide; Thancat DD, available from Texaco; and the like. Mannich bases known per se obtained from secondary amines such as dimethylamine and aldehydes, preferably formaldehyde, or ketones such as acetone, methyl ethyl ketone or cyclohexanone and phenols such as nonylphenol or bisphenol may also be used as catalysts. Silaamines having carbon-silicon bonds as described, e.g., in German Patent 1,229,290 and U.S. Pat. No. 3,620,984 may also be used as catalysts. Examples include 2,2,4-trimethyl-2-silamorpholine and 1,3-diethylaminoethyltetramethyl-disoloxane.

Organic tin compounds may also be used as catalysts according to the invention. The organic tin compounds used are preferably tin(II) salts of carboxylic acids such as tin(II) acetate, tin(II) octoate, tin(II) ethyl hexoate and tin(II) laurate and tin(IV) compounds such as dibutyl tin oxide, dibutyl tin dichloride, dibutyl tin diacetate, dibutyl tin dilaurate, dibutyl tin maleate or dioctyl tin diacetate. All the above-mentioned catalysts may, of course, be used as mixtures.

When used, the co-catalyst is used in an amount of from 0.04 to 0.60% by weight based upon the total weight of all the isocyanate-reactive components in the reaction mixture.

According to the invention, the components may be reacted together by known processes often using mechanical devices such as those described in U.S. Pat. No. 2,764,565. Details concerning processing apparatus which may be used according to the invention may be found in Kunststoff-Handbuch, Volume VII, published by Vieweg and H öchtlen, Carl-Hanser-Verlag, Munich, 1966, pages 121 and 205.

The foaming reaction for producing foam products is carried out inside molds. In the process of the invention, a plastic film or sheet (e.g., of PVC or ABS) is preferably placed in the bottom (and may also be placed on the top) of a mold. The foamable reaction mixture is introduced into the mold (either on top of the film or sheet or between the films if both the top and bottom of the mold are covered) which may be made of a metal such as aluminum or a plastics material such as an epoxide resin. The reaction mixture foams up inside the mold to produce the shaped product. Where a plastic film or sheet is not used, as is well known in the art, it may be necessary to apply a mold release agent to the surface of the mold.

The examples clearly illustrate that:

1) various amino acids can be used;

2) potassium hydroxide is not the active catalyst; and 3) the amino acid salts have similar properties to those of typical amine catalysts.

The invention is further illustrated but is not intended to be limited by the following examples in which all parts and percentages are by weight unless otherwise specified.

EXAMPLES

In the examples, the following materials were used:
KOH: 0.642N aqueous potassium hydroxide
CAOH: 1.0N calcium hydroxide
POLYOL A: a 4000 molecular weight, 2 OH functionality polyether diol
POLYOL B: a 6000 molecular weight 3 OH functionality polyether triol
BD: 1,4-butane diol
DMHA: N,N-dimethylcyclohexylamine ISO: a commercially available polymethylenepoly(phenyl isocyanate) having an isocyanate group content of 31.5% by weight and a Brookfield viscosity at 25° C. of 200 mPa.s of 200; the isocyanate is sold by Miles Inc. as Mondur MR.

N,N-Dimethylcyclohexylamine was used in some of the examples to promote the reactivity of the polyol blend. The use of the co-catalyst was not necessary, rather its use conveniently sped up the preparation of test plaques. Its use is below typically recommended levels for this catalyst, either alone or with another catalyst.

Potassium Glycinate ("PG"): To a 500 ml 2-neck round bottom flask, equipped with a reflux condenser and a pressure equalizing addition funnel was charged 10.00 parts (0.133 eqv.) of glycine. 198 ml of the KOH (0.127 eqv.) was added to the addition funnel. The basic solution was added to the glycine, with magnetic stirring, over about 4 minutes. The reaction mixture was then stirred at about 70° C. for an additional hour, to insure complete reaction. The water was stripped off the reaction product at about 10 mm Hg and about 70° C. The white powder was broken up and dried overnight at about 80° C. and at about 2 mm Hg. A freely flowing powder was obtained and stored in a dry, airtight container Calcium Glycinate ("CG"): To a 500 ml 2-neck round bottom flask, equipped with a reflux condenser and a pressure equalizing addition funnel was charged 10.00 parts (0.133 eqv.) of glycine. 126 ml of CAOH (0.126 eqv.) was added to the addition funnel. The basic solution was added to the glycine, with magnetic stirring, over about 4 minutes. The reaction mixture was then stirred at about 70° C. for an additional hour, to insure complete reaction. The water was stripped off the reaction product at about 10 mm Hg and about 70° C. The white powder was broken up and dried overnight at about 80° C. and at about 2 mm Hg. A freely flowing powder was obtained and stored in a dry, airtight container.

Potassium Lysinate ("PL"): To a 500 ml 2-neck round bottom flask, equipped with a reflux condenser and a pressure equalizing addition funnel was charged 10.00 parts (0.068 eqv.) of lysine. 101 ml of KOH (0.065 eqv.) was added to the addition funnel. The basic solution was added to the lysine, with magnetic stirring, over about 4 minutes. The reaction mixture was then stirred at about 70° C. for an additional hour, to insure complete reaction. The water was stripped off the reaction product at about 10 mm Hg and about 70° C. The yellowish wax was broken up and dried overnight at about 80° C and at about 2 mm Hg. The yellowish wax was then stored in a dry, airtight container.

Potassium Alaninate ("PA"): To a 500 ml 2-neck round bottom flask, equipped with a reflux condenser and a pressure equalizing addition funnel was charged 10.00 parts (0.112 eqv.) of alanine. 180 ml of the KOH (0.116 eqv.) was added to the addition funnel. The basic solution was added to the alanine, with magnetic stirring, over about 4 minutes. The reaction mixture was then stirred at about 70° C. for an additional hour, to insure complete reaction. The water was stripped off the reaction product at about 10 mm Hg and about 70° C. The white powder was broken up and dried overnight at about 80° C. and at about 2 mm Hg. A freely flowing powder was obtained and stored in a dry, airtight container.

Potassium Aspartate ("PAS"): To a 500 ml 2-neck round bottom flask, equipped with a reflux condenser and a pressure equalizing addition funnel was charged 10.00 parts (0.068 eqv.) of aspartic acid. 101 ml of KOH (0.065 eqv.) was added to the addition funnel. The basic solution was added to the aspartic acid, with magnetic stirring, over about 4 minutes. The reaction mixture was then stirred at about 70° C. for an additional hour, to insure complete reaction. The water was stripped off the reaction product at about 10 mm Hg and about 70° C. The white powder was broken up and dried overnight at about 80° C. and at about 2 mm Hg. A freely flowing powder was obtained and stored in a dry, airtight container.

Potassium Glutamate ("PGL"): To a 500 ml 2-neck round bottom flask, equipped with a reflux condenser and a pressure equalizing addition funnel was charged 10.00 parts (0.150 eqv.) of glutamic acid. 221 ml of KOH (0.142 eqv.) was added to the addition funnel. The basic solution was added to the glutamic acid, with magnetic stirring, over about 4 minutes. The reaction mixture was then stirred at about 70° C. for an additional hour, to insure complete reaction. The water was stripped off the reaction product at about 10 mm Hg and about 70° C. A viscous, clear liquid was obtained and stored in a dry, airtight container.

Various preblends were prepared by mixing the ingredients noted in Table 1 in the proportions shown (in Table 1, all parts are parts by weight). The amino acid salt (or, if used, the KOH) was weighed out and dissolved in the total amount of water shown. The aqueous solution of the salt (or, KOH, if used) was then added to the preblend shown and mixed thoroughly. In the case of Example 4, the water was mixed as a part of the preblend and the "extra" DMHA was weighed out and added to the preblend with thorough mixing. The resultant polyol blends were then tightly sealed to prevent contamination and/or loss of reactants (especially water) and allowed to equilibrate, in a water bath, to about 21° C. (70° F.).

Reactivities were run and plaques were molded using the equilibrated polyol blends and ISO, which had also been equilibrated to about 21° C. (70° F.). Reactivities were tested and plaques were prepared at an isocyanate index of 100. A high shear mixer, attached to an air motor rotating at 3500 rpm, was used to mix the polyol blend with the isocyanate in a 1 quart Lily Sweetheart brand unwaxed cup. After 8 seconds of mixing, the reaction mixture was quickly and accurately weighed into another unwaxed cup for reactivity measurements or into a 15.24 cm×22.86 cm×2.54 cm (6 inch×9 inch×1 inch) aluminum mold, preheated to about 38° C. (100° F.) for physical property testing.

The reactivity results are set forth in Table 2, and the physical properties were as indicated in Table 3.

TABLE 1

| Preblend | EXAMPLE | | | | | | | |
|---|---|---|---|---|---|---|---|---|
| | 1 | 2 | 3 | 4 | 5 | 6 | 7 | 8 |
| POLYOL A | 45.0 | → | → | → | → | → | → | → |
| POLYOL B | 45.0 | → | → | → | → | → | → | → |
| BD | 2.0 | → | → | → | → | → | → | → |
| DMHA | 0.4 | 0.4 | — | 0.4 | 0.4 | 0.4 | 0.4 | 04 |
| WATER | 2.8 | → | → | → | → | → | → | → |
| PG | 2.0 | — | — | — | — | — | — | — |
| CG | — | 2.0 | — | — | — | — | — | — |
| PL | — | — | — | — | 2.5 | — | — | — |
| KOH | — | — | 0.25 | — | — | — | — | — |
| PA | — | — | — | — | — | 1.0 | — | — |
| PAS | — | — | — | — | — | — | 3.0 | — |
| PGL | — | — | — | — | — | — | — | 5.0 |
| EXTRA DMHA | — | — | — | 0.7 | — | — | — | — |

TABLE 2

| REACTIVITIES | EXAMPLE | | | | | | | |
|---|---|---|---|---|---|---|---|---|
| | 1 | 2 | 3 | 4 | 5 | 6 | 7 | 8 |
| Cream time, sec | 13 | 27 | tfm* | 14 | 12 | 14 | 15 | 15 |
| Top of cup, sec | 31 | 140 | tfm* | 32 | 31 | 33 | 33 | 34 |
| End of rise, sec | 52 | 260 | tfm* | 63 | 44 | 66 | 54 | 54 |

*tfm: too fast to measure

The top of cup time is the time it takes the rising foam to break the imaginary plane across the top of the cup, measured from when the isocyanate and polyol blend were first combined. This is an indication of how well a system foams. The end of rise time is the time it takes the foam to stop rising, measured from when the isocyanate and polyol blend were first combined.

TABLE 3

| PHYSICAL PROPERTIES | EXAMPLE | | | | | | | |
|---|---|---|---|---|---|---|---|---|
| | 1 | 2 | 3 | 4 | 5 | 6 | 7 | 8 |
| Molded density, kg/m$^3$ | 91.2 | 91.2 | npt* | 89.6 | 97.6 | 89.0 | 91.7 | 91.2 |
| Tensile, kPa ASTM D 3574 | 319 | 305 | npt* | 252 | 326 | 304 | 258 | 221 |
| % elongation ASTM D 3574 | 39.2 | 36.0 | npt* | 45.5 | 32.9 | 41.8 | 37.8 | 40.6 |
| Die C Tear, N/m ASTM D 624 & ASTM D 3489 | 1121 | 1261 | npt* | 893 | 1103 | 1111 | 928 | 819 |
| Unaged compression set, % ASTM D3574 | 88.1 | 80.4 | npt* | 60.2 | 60.4 | 82.0 | 76.0 | 86.6 |
| 40% CLD, N/m ASTM D3574 | 1925 | 2380 | npt* | 1488 | 1688 | 1809 | 1541 | 1059 |
| 180° C. peel from cast PVC, N/m ASTM D413 | 39 | nt* | npt* | 140 | 39 | 28 | 175 | 128 |
| 180° C. peel from vac-formed vinyl, N/m ASTM D413 | 333 | nt* | npt* | 228 | 226 | 236 | 354 | 315 | nt*: not tested
npt*: too fast reacting, not possible to test.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the preparation of a molded product comprising:
    a) introducing a polyurethane foam forming mixture into a mold, said reaction mixture comprising:
        1) one or more relatively high molecular weight polyether polyols,
        2) water, in an amount of from 0.75 to 3.5% by weight based upon the weight of all isocyanate-reactive materials,
        3) one or more catalysts, and
        4) one or more polyisocyanates, with the amounts of reactants being such that the isocyanate to hydroxyl group equivalent ratio is from 0.4:1 to 1.3:1,
    b) allowing said reaction mixture to fully react, and
    c) removing the resultant product from the mold, the improvement wherein said catalyst comprises a catalytic amount of a metal carboxylate salt of an amino acid, wherein said amino acid is selected from the group consisting of glycine, alanine, valine, leucine, isoleucine, serine, threonine, cysteine, cystine, methionine, lysine, arginine, phenylalanine, tyrosine, proline, hydroxyproline, histidine, tryptophan, aspartic acid, asparagine, glutamine, thryoxine, o-aminobenzoic, m-aminobenzoic, p-aminobenzoic and glutamic acids.

2. The process of claim 1 wherein a plastic film or sheet is placed in the mold prior to step a) and the reaction mixture is introduced on top of said film or sheet.

3. The process of claim 1, wherein said metal salt is used in an amount of from 0.1 to 7.5% by weight based upon the total weight of isocyanate reactive components.

4. The process of claim 3, wherein said metal salt is used in an amount of from 1.0 to 5.5% by weight based upon the total weight of isocyanate reactive components.

5. The process of claim 1, wherein said metal is potassium.

6. In a process for the preparation of a molded product comprising:
    (a) introducing a polyurethane foam forming mixture into a mold, said reaction mixture comprising:
        1) one or more relatively high molecular weight polyether polyols,
        2) water, in an amount of from 0.75 to 3.5% by weight based upon the weight of all isocyanate-reactive materials.
        3) one or more catalysts, and
        4) one or more polyisocyanates, with the amounts of reactants being such that the isocyanate to hydroxyl group equivalent ratio is from 0.4:1 to 1.3:1,
    b) allowing said reaction mixture to fully react, and
    c) removing the resultant product from the mold, the improvement wherein said catalyst comprises a catalytic amount of a metal carboxylate salt of an amino acid, wherein said amino acid is an α-amino acid.

7. The process of claim 6, wherein said α-amino acid is of the formula:

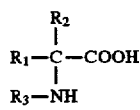

where $R_1$ is selected from the group consisting of H, a $C_1$ to $C_{18}$ alkyl group (which may be straight or branched chain and which may be substituted with groups selected from the group consisting of amide, amine, guanidino, hydroxyl, carboxylic, thioether, thiol or disulfide), a $C_3$ to $C_6$ cycloaliphatic group, a $C_6$ to $C_{10}$ aromatic group, a $C_7$ to $C_{28}$ aralkyl group, an imidazole group or together with $R_3$ forms a heterocyclic ring;

$R_2$ is H or together with $R_3$ forms a heterocyclic ring or together with $R_1$ forms an aromatic or aliphatic ring;

$R_3$ is selected from the group consisting of H, $C_1$ to $C_{18}$ alkyl, and $C_7$ to $C_{28}$ alkaryl or together with either $R_1$ or $R_2$ forms a heterocyclic ring.

* * * * *